US008617702B2

United States Patent
Jha et al.

(10) Patent No.: US 8,617,702 B2
(45) Date of Patent: Dec. 31, 2013

(54) THERMALLY INSULATED STRUCTURAL MEMBERS, AND DOORS AND WINDOWS INCORPORATING THEM

(75) Inventors: Roshan Kumar Jha, Karnataka (IN); Radha Kamalakaran, Karnataka (IN); Satishkumar H. Mahanth, Karnataka (IN); Jan Matthijssen, Moerstraten (NL); Sathya Narayan, Karnataka (IN)

(73) Assignee: Sabic Innovative Plastics IP B.V. (NL)

( * ) Notice: Subject to any disclaimer, the term of this patent is extended or adjusted under 35 U.S.C. 154(b) by 597 days.

(21) Appl. No.: 12/768,989

(22) Filed: Apr. 28, 2010

(65) Prior Publication Data

US 2011/0265408 A1    Nov. 3, 2011

(51) Int. Cl.
*E06B 3/20* (2006.01)
*E06B 3/12* (2006.01)
*E04B 1/74* (2006.01)
*C08K 3/40* (2006.01)
*C08L 35/08* (2006.01)
*C08L 33/24* (2006.01)

(52) U.S. Cl.
USPC ....... 428/325; 428/332; 52/309.13; 52/656.5; 524/494; 525/92 B

(58) Field of Classification Search
None
See application file for complete search history.

(56) References Cited

U.S. PATENT DOCUMENTS

| 3,524,794 A | 8/1970 | Jonnes et al. |
| 3,608,010 A | 9/1971 | Stayner |
| 3,700,478 A | 10/1972 | Bingham |
| 3,707,414 A | 12/1972 | Wismer |
| 3,832,426 A | 8/1974 | Malthouse et al. |
| 3,917,547 A | 11/1975 | Massey |
| 4,213,236 A | 7/1980 | Diels et al. |
| 4,391,646 A | 7/1983 | Howell |
| 4,692,480 A | 9/1987 | Takahashi et al. |
| 4,786,539 A | 11/1988 | Grether |
| 5,098,781 A | 3/1992 | Minnick et al. |
| 5,132,365 A | 7/1992 | Gallucci et al. |
| 5,727,356 A | 3/1998 | Ensinger et al. |

(Continued)

FOREIGN PATENT DOCUMENTS

EP    1760244 A1    3/2007

OTHER PUBLICATIONS

Avalle et al. "Characterization of polymeric structural foams under compressive impact loading by means of energy-absorption diagram". International Journal of Impact Engineering, (2000); pp. 455-472.*

3M Glass Bubbles S38XHS, Issued Sep. 2008, 2 pages.

(Continued)

*Primary Examiner* — Prashant J Khatri
(74) *Attorney, Agent, or Firm* — Cantor Colburn LLP

(57) ABSTRACT

A thermally insulated structural member for a door or window includes a metal frame and a plastic insulation bar. The plastic insulation bar is formed from a thermoplastic composition that includes about 55 to about 95 weight percent of a compatibilized polyamide-poly(arylene ether) composition, and about 5 to about 45 weight percent of hollow glass beads. The hollow glass beads used in the thermoplastic composition have a volume-average diameter of about 20 to about 60 micrometers, a true density of about 0.3 to about 0.5 grams per milliliter, and an isostatic crush strength of about 30 to about 60 megapascals. The thermoplastic composition includes less than 5 weight percent of fibrous reinforcement. The thermally insulated structural member provides improved thermal insulation compared to structural member utilizing fiberglass-reinforced plastic insulation bars.

18 Claims, 4 Drawing Sheets

(56) References Cited

U.S. PATENT DOCUMENTS

| | | | |
|---|---|---|---|
| 6,047,514 A * | 4/2000 | Verch | 52/656.5 |
| 6,357,197 B1 | 3/2002 | Serino et al. | |
| 6,531,222 B1 | 3/2003 | Tanaka et al. | |
| 6,593,411 B2 | 7/2003 | Koevoets et al. | |
| 6,914,024 B2 | 7/2005 | Anderson | |
| 7,226,963 B2 | 6/2007 | Koevoets et al. | |
| 7,312,168 B2 | 12/2007 | Anderson | |
| 2003/0134920 A1 | 7/2003 | Poisl et al. | |
| 2004/0171733 A1 * | 9/2004 | Balfour et al. | 524/494 |
| 2005/0038203 A1 | 2/2005 | Elkovitch et al. | |
| 2005/0238864 A1 | 10/2005 | D'Souza et al. | |
| 2006/0234034 A1 | 10/2006 | Tschech et al. | |
| 2007/0123625 A1 * | 5/2007 | Dorade et al. | 524/423 |
| 2007/0129502 A1 | 6/2007 | Kawabe et al. | |
| 2007/0155858 A1 | 7/2007 | Israelson | |
| 2008/0071034 A1 | 3/2008 | Braidwood et al. | |
| 2008/0132637 A1 | 6/2008 | Tokiwa | |

OTHER PUBLICATIONS

3M Glass Bubbles K Series S Series, Sep. 2007, 4 pages.
3M Glass Bubbles S60HS, Issued: Jan. 2008, 2 pages.
3M iM30K Hi-Strength Glass Bubbles, Issued: Jan. 2008, 2 pages.
3M Microspheres Selection Guide, Issued Nov. 2007, 4 pages.
AM Profiles Newsletter, Dec. 2008, 2 pages.
ASTM E 1530-06, Standard Test Method for Evaluating the Resistance to Thermal Transmission of Materials by the Guarded Heat Flow Meter Technique, Downloaded Jan. 29, 2010, 9 pages.
Cenosphere CIL 30 data sheet, http://en.cenosphereindia.com/cil30.htm[Jan. 28, 2010 12:11:19 PM], 1 page.
Dynamar FX9613, Polymer Processing Additives FX9613, Issued Aug. 2001, 2 pages.
EP 0548531 A1, Publication date: Jun. 30, 1993, Abstract 1 page.
EP 1113143 A2, Publication date: Jul. 4, 2007, Abstract, 1 page.
JP 10196228, Publication date: Jul. 28, 1998, Abstract, 1 page.
Liang et al., Measurement of thermal conductivity of hollow glass-bead-filled polypropylene composites, Materials Properties, Polymer Testing 25 (2006) 527-531.
Raico, System Solutions for Sophisticated Architecture, Curtain Walls/Integration Windows, Therm+ Curtain Wall System, No date, 32 pages.
Raico Frame +, Products, No date, 1 page.
Raico Frame +, Company News, 2008, 1 page.
International Search Report for International Application No. PCT/IB2011/051630, International Application Filing Date Apr. 14, 2011, Date of Mailing Jul. 19, 2011, 4 pages.
Written Opinion for International Application No. PCT/IB2011/051630, International Application Filing Date Apr. 14, 2011, Date of Mailing Jul. 19, 2011, 5 pages.
DE3801564 A1, Aug. 3, 1989, Abstract Only, 1 page.
DE3801564A1; Aug. 3, 1989; Machine Translation (6 pages) with appended Foreign Patent to provide Figures (4 pages).
JP05-171032 Machine Translation; Jul. 9, 1993; 19 pages.
JP11-030075 Machine Translation; Feb. 2, 1999; 16 pages.
JP2007-119669 Machine Translation; May 17, 2007; 13 pages.
CN101629466A; Jan. 20, 2010; Machine Translation; 23 pages.

* cited by examiner

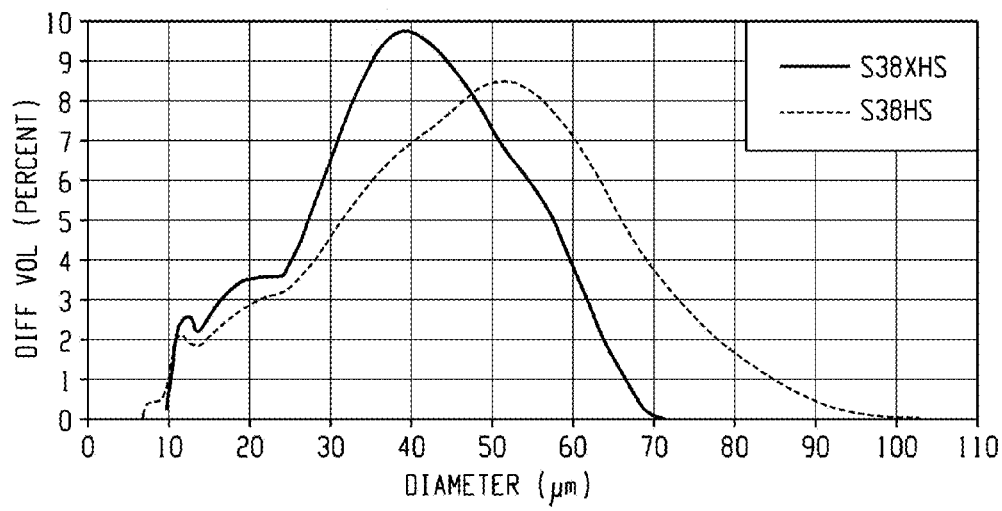
Fig. 4
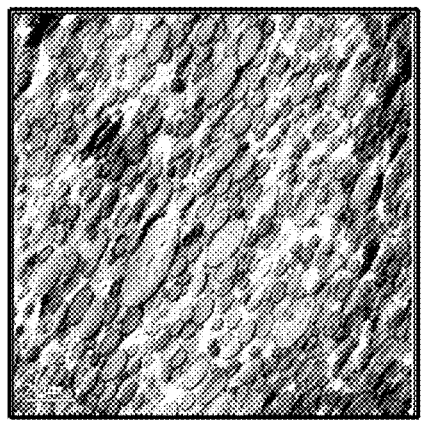 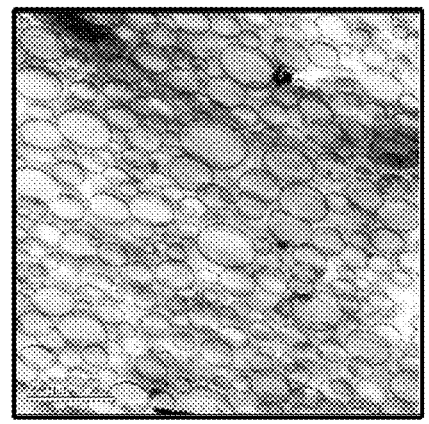
Fig. 5(a)   Fig. 5(b)

(a) (b) (c)

(a) (b) (c)

THERMALLY INSULATED STRUCTURAL MEMBERS, AND DOORS AND WINDOWS INCORPORATING THEM

BACKGROUND OF THE INVENTION

Poly(arylene ether) resins have been blended with polyamide resins to provide compositions having a wide variety of beneficial properties such as heat resistance, chemical resistance, impact strength, hydrolytic stability, and dimensional stability.

Glass fiber-filled poly(arylene ether)-polyamide blends have been used to mold insulation materials that are incorporated into door and window frames in order to decrease their thermal conductivity. See, for example, U.S. Pat. No. 5,727,356 to Ensinger et al., and U.S. Patent Application Publication No. US 2006/0234034 A1 of Tschech et al. These insulation materials provide significant improvements in the energy efficiency of the doors and windows into which they are incorporated. However, there remains a need for further reductions in the thermal conductivity of doors and windows, as well as means of achieving such thermal conductivity reductions with reduced amounts of poly(arylene ether) and polyamide.

BRIEF DESCRIPTION OF THE INVENTION

One embodiment is a thermally insulated structural member for a door or window, comprising: a frame comprising a metal; and an insulation bar at least partially enclosed by the frame; wherein the insulation bar comprises a thermoplastic composition comprising about 55 to about 95 weight percent of a compatibilized polyamide-poly(arylene ether) composition, and about 5 to about 45 weight percent of hollow glass beads, wherein the hollow glass beads have a volume-average diameter of about 20 to about 60 micrometers; a true density of about 0.3 to about 0.5 grams per milliliter, and an isostatic crush strength of about 30 to about 60 megapascals; wherein the thermoplastic composition comprises less than 5 weight percent of fibrous reinforcement.

Another embodiment is a window comprising the thermally insulated structural member.

Another embodiment is a door comprising the thermally insulated structural member.

Another embodiment is a method of reducing the thermal conductivity of a thermally insulated structural member for a door or window, comprising: at least partially enclosing in a metal frame an insulation bar comprising a thermoplastic composition comprising about 55 to about 95 weight percent of a compatibilized polyamide-poly(arylene ether) composition, and about 5 to about 45 weight percent of hollow glass beads, wherein the hollow glass beads have a volume-average diameter of about 20 to about 60 micrometers; a true density of about 0.3 to about 0.5 grams per milliliter, and an isostatic crush strength of about 30 to about 60 megapascals; wherein the thermoplastic composition comprises less than 5 weight percent of fibrous reinforcement.

These and other embodiments are described in detail below.

BRIEF DESCRIPTION OF THE DRAWINGS

Referring now to the drawings wherein like elements are numbered alike in several FIGURES:

FIG. 4 is a plot of the particle size distributions of S38HS and S38XHS hollow glass beads.

FIG. 5 consists of transmission electron micrographs of sections of molded parts prepared from (a) Comparative Example 1 without hollow glass beads and (b) Example 5 with a nominal 20 weight percent of S38XHS hollow glass beads; the oval shapes in each image correspond to particles of the dispersed poly(arylene ether) phase (the glass beads are not visible in FIG. 5(b) because each glass bead is much larger than the field of the image).

DETAILED DESCRIPTION OF THE INVENTION

The present inventors have found that the thermal conductivity of structural members in doors, windows, and other construction elements can be significantly reduced by incorporating in the metal frame of the structural members an insulation bar with a poly(arylene ether)-polyamide blend containing hollow glass beads with a specific diameter, density, and crush strength. Thus, one embodiment is a thermally insulated structural member for a door or window, comprising: a frame comprising a metal; and an insulation bar at least partially enclosed by the frame; wherein the insulation bar comprises a thermoplastic composition comprising about 55 to about 95 weight percent of a compatibilized polyamide-poly(arylene ether) composition, and about 5 to about 45 weight percent of hollow glass beads, wherein the hollow glass beads have a volume-average diameter of about 20 to about 60 micrometers; a true density of about 0.3 to about 0.5 grams per milliliter, and an isostatic crush strength of about 30 to about 60 megapascals; wherein the thermoplastic composition comprises less than 5 weight percent of fibrous reinforcement.

Figure 1:
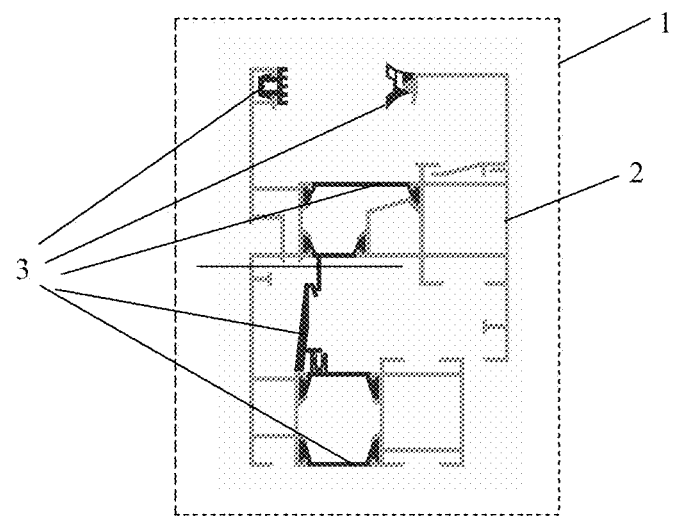
FIG. 1 is a drawing of a section of a thermally insulated structural member.

FIG. 1 is a drawing of a section of a structural member 1 including a frame 2 and multiple insulation bars 3.

Figure 2:
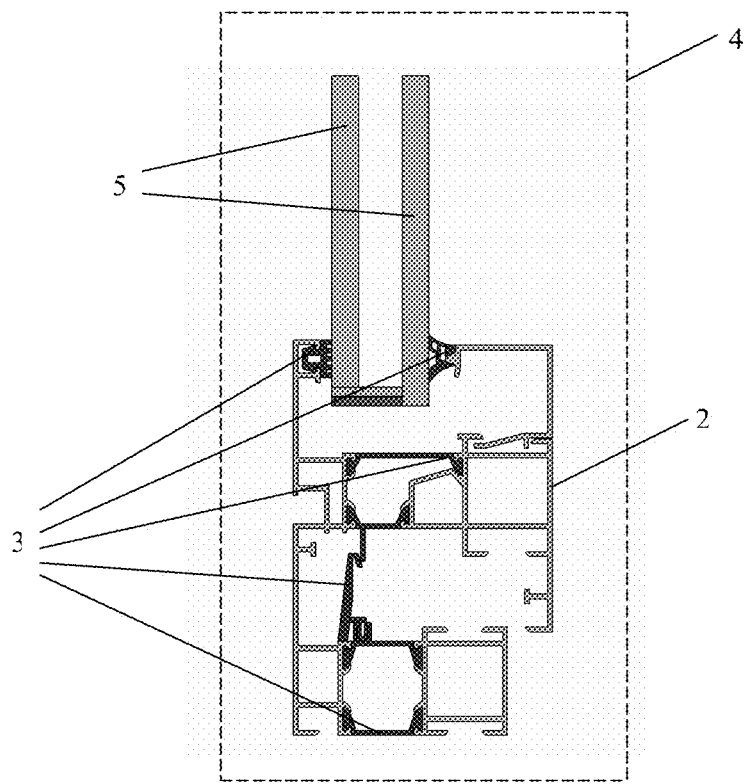
FIG. 2 is a cross-sectional drawing of a portion of a double-glazed window comprising the thermally insulated structural member.

One embodiment is a window comprising the thermally insulated structural member. FIG. 2 is a cross-sectional view of a portion of a double-glazed window 4, the portion including frame 2, multiple insulation bars 3, and two glass panes 5.

Figure 3:
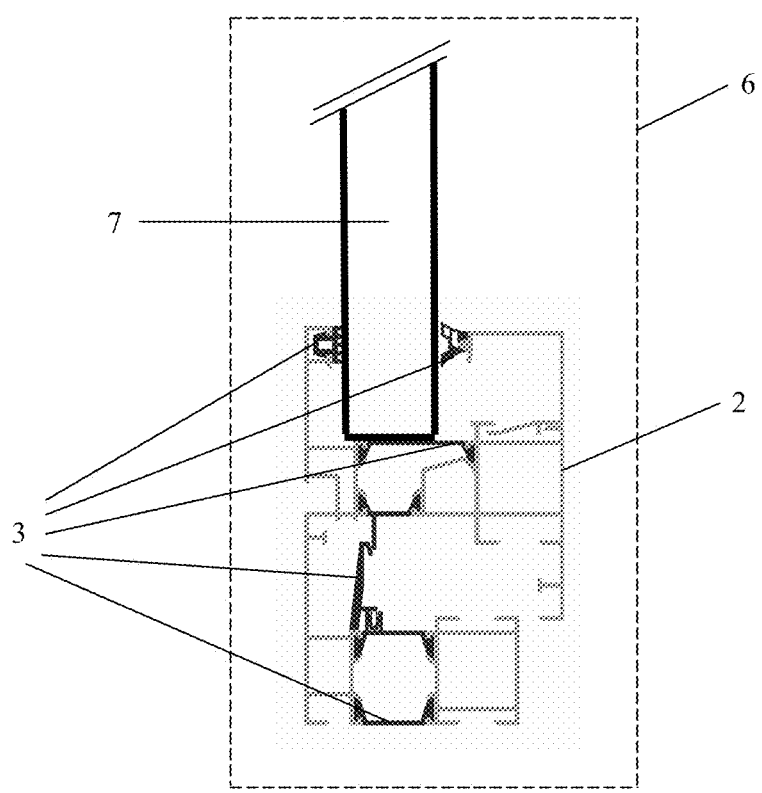
FIG. 3 is cross-sectional drawing of a portion of a door comprising the thermally insulated structural member.

One embodiment is a door comprising the thermally insulated structural member. FIG. 3 is a cross-sectional view of a portion of a door 6, the portion including frame 2, multiple insulation bars 3, and a door panel 7.

The structural member comprises a frame comprising a metal. Suitable metals include, for example, aluminum, aluminum allows, iron, iron alloys (including steels such as stainless steel). Use of aluminum and aluminum alloys is presently preferred. Sections of the frame are typically formed by profile extrusion of molten metal.

In addition to the frame, the structural member comprises an insulation bar at least partially enclosed by the frame. The insulation bar comprises a thermoplastic composition comprising about 55 to about 95 weight percent of a compatibilized polyamide-poly(arylene ether) composition, and about 5 to about 45 weight percent of hollow glass beads. Within the range of about 55 to about 95 weight percent, the amount of compatibilized polyamide-poly(arylene ether) composition can be about 60 to about 90 weight percent, specifically about 70 to about 85 weight percent, more specifically about 75 to about 85 weight percent. Within the range of about 5 to about 45 weight percent, the amount of hollow glass beads can be about 10 to about 35 weight percent, specifically about 15 to about 25 weight percent.

A polyamide is used to prepare the compatibilized polyamide-poly(arylene ether) composition. Polyamides, also known as nylons, are characterized by the presence of a plurality of amide (—C(O)NH—) groups, and are described in U.S. Pat. No. 4,970,272 to Gallucci. Suitable polyamide resins include polyamide-6, polyamide-6,6, polyamide-4, polyamide-4,6, polyamide-12, polyamide-6,10, polyamide 6,9, polyamide-6,12, amorphous polyamide resins, polyamide 6/6T and polyamide 6,6/6T with triamine contents below 0.5 weight percent, polyamide 9T, and combinations thereof. In some embodiments, the polyamide resin comprises polyamide-6,6. In some embodiments, the polyamide resin comprises polyamide-6 and polyamide-6,6. In some embodiments, the polyamide resin or combination of polyamide resins has a melting point ($T_m$) greater than or equal to 171° C. When the polyamide comprises a super tough polyamide, that is, a rubber-toughened polyamide, the composition may or may not contain a separate impact modifier.

Polyamides may be obtained by a number of well known processes such as those described in U.S. Pat. Nos. 2,071,250, 2,071,251, 2,130,523, and 2,130,948 to Carothers; 2,241,322 and 2,312,966 to Hanford; and 2,512,606 to Bolton et al. Polyamide resins are commercially available from a variety of sources.

Polyamides having an intrinsic viscosity of up to 400 milliliters per gram (mL/g) can be used, or, more specifically, having a viscosity of 90 to 350 mL/g, or, even more specifically, having a viscosity of 110 to 240 mL/g, as measured in a 0.5 weight percent solution in 96 weight percent sulfuric acid in accordance with ISO 307. The polyamide can have a relative viscosity of up to 6, or, more specifically, a relative viscosity of 1.89 to 5.43, or, even more specifically, a relative viscosity of 2.16 to 3.93. Relative viscosity is determined according to DIN 53727 in a 1 weight percent solution in 96 weight percent sulfuric acid.

In some embodiments, the polyamide resin comprises a polyamide having an amine end group concentration greater than or equal to 35 micro equivalents amine end group per gram of polyamide (µeq/g) as determined by titration with HCl. The amine end group concentration may be greater than or equal to 40 µeq/g, or, more specifically, greater than or equal to 45 µeq/g. Amine end group content may be determined by dissolving the polyamide in a suitable solvent, optionally with heat. The polyamide solution is titrated with 0.01 Normal hydrochloric acid (HCl) solution using a suitable indication method. The amount of amine end groups is calculated based the volume of HCl solution added to the sample, the volume of HCl used for the blank, the molarity of the HCl solution, and the weight of the polyamide sample.

A poly(arylene ether) is used to prepare the compatibilized polyamide-poly(arylene ether) composition. The poly(arylene ether) comprises repeating structural units of the formula

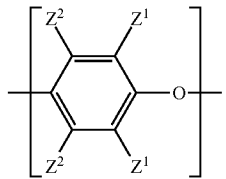

wherein for each structural unit, each $Z^1$ is independently halogen, unsubstituted or substituted $C_1$-$C_{12}$ hydrocarbyl with the proviso that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; and each $Z^2$ is independently hydrogen, halogen, unsubstituted or substituted $C_1$-$C_{12}$ hydrocarbyl with the proviso that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms.

As used herein, the term "hydrocarbyl", whether used by itself, or as a prefix, suffix, or fragment of another term, refers to a residue that contains only carbon and hydrogen. The residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties. However, when the hydrocarbyl residue is described as "substituted", it can contain heteroatoms over and above the carbon and hydrogen members of the substituent residue. Thus, when specifically described as substituted, the hydrocarbyl residue can also contain halogen atoms, nitro groups, cyano groups, carbonyl groups, carboxylic acid groups, ester groups, amino groups, amide groups, sulfonyl groups, sulfoxyl groups, sulfonamide groups, sulfamoyl groups, hydroxyl groups, alkoxyl groups, or the like, and it can contain heteroatoms within the backbone of the hydrocarbyl residue.

The poly(arylene ether) can comprise molecules having aminoallyl-containing end group(s), typically located in an ortho position to the terminal hydroxy group. Also frequently present are tetramethyldiphenoquinone (TMDQ) end groups, typically obtained from reaction mixtures in which tetramethyldiphenoquinone by-product is present.

The poly(arylene ether) can be in the form of a homopolymer; a copolymer; a graft copolymer; an ionomer; or a block copolymer; as well as combinations comprising at least one of the foregoing. Poly(arylene ether) includes polyphenylene ether comprising 2,6-dimethyl-1,4-phenylene ether units optionally in combination with 2,3,6-trimethyl-1,4-phenylene ether units. In some embodiments, the poly(arylene ether) consists of poly(2,6-dimethyl-1,4-phenylene ether). In this context, the term "consists of" excludes the reaction products of poly(arylene ether)s and functionalizing agents, such as acid-functionalized poly(arylene ether)s and anhydride-functionalized poly(arylene ether)s.

The poly(arylene ether) can be prepared by the oxidative coupling of the corresponding monohydroxyaromatic compound(s) such as 2,6-xylenol and/or 2,3,6-trimethylphenol. Catalyst systems are generally employed for such coupling.

They can contain heavy metal compound(s) such as a copper, manganese, or cobalt compounds, usually in combination with various other materials such as a secondary amine, tertiary amine, halide or combination of two or more of the foregoing.

In some embodiments, the poly(arylene ether) has an intrinsic viscosity of about 0.2 to about 1.0 deciliter per gram, as measured by ubbelohde viscometer in chloroform at 25° C. In some embodiments, the poly(arylene ether) has an intrinsic viscosity of about 0.3 to about 0.6 deciliter per gram. When the poly(arylene ether) is a poly(2,6-dimethyl-1,4-phenylene ether), the intrinsic viscosity range of about 0.3 to about 0.6 deciliter per gram can correspond to a number average molecular weight range of about 16,000 to about 25,000 atomic mass units.

In some embodiments, the compatibilized polyamide-poly(arylene ether) composition comprises the poly(arylene ether) and the polyamide in a weight ratio of about 0.5:1 to about 1.2:1, specifically about 0.8:1 to about 1.2:1, more specifically about 1:1 to about 1.2:1.

In some embodiments, a compatibilizing agent is used to facilitate formation of the compatibilized blend of the polyamide and the poly(arylene ether). As used herein, the term "compatibilizing agent" refers to a polyfunctional compound that interacts with the poly(arylene ether), the polyamide resin, or both. This interaction may be chemical (for example, grafting) and/or physical (for example, affecting the surface characteristics of the dispersed phases). In either instance the resulting compatibilized blend exhibits improved compatibility, particularly as evidenced by enhanced impact strength, mold knit line strength, and/or tensile elongation. As used herein, the expression "compatibilized blend" refers to compositions that have been physically and/or chemically compatibilized with a compatibilizing agent, as well as blends of poly(arylene ether)s and polyamides that are physically compatible without such agents (as, for example, from compatibility-enhancing dibutylaminomethyl substituents on the poly(arylene ether)).

Examples of compatibilizing agents that may be employed include liquid diene polymers, epoxy compounds, oxidized polyolefin wax, quinones, organosilane compounds, polyfunctional compounds, functionalized poly(arylene ether)s, and combinations thereof. Compatibilizing agents are further described in U.S. Pat. Nos. 5,132,365 to Gallucci, and 6,593,411 and 7,226,963 to Koevoets et al.

In some embodiments, the compatibilizing agent comprises a polyfunctional compound. Polyfunctional compounds that may be employed as a compatibilizing agent are typically of three types. The first type of polyfunctional compound has in the molecule both (a) a carbon-carbon double bond or a carbon-carbon triple bond and (b) at least one carboxylic acid, anhydride, amide, ester, imide, amino, epoxy, orthoester, or hydroxy group. Examples of such polyfunctional compounds include maleic acid; maleic anhydride; fumaric acid; glycidyl acrylate, itaconic acid; aconitic acid; maleimide; maleic hydrazide; reaction products resulting from a diamine and maleic anhydride, maleic acid, fumaric acid, etc.; dichloro maleic anhydride; maleic acid amide; unsaturated dicarboxylic acids (for example, acrylic acid, butenoic acid, methacrylic acid, ethylacrylic acid, pentenoic acid, decenoic acids, undecenoic acids, dodecenoic acids, linoleic acid, etc.); esters, acid amides or anhydrides of the foregoing unsaturated carboxylic acids; unsaturated alcohols (for example, alkanols, crotyl alcohol, methyl vinyl carbinol, 4-pentene-1-ol, 1,4-hexadiene-3-ol, 3-butene-1,4-diol, 2,5-dimethyl-3-hexene-2,5-diol, and alcohols of the formula $C_nH_{2n-5}OH$, $C_nH_{2n-7}OH$ and $C_nH_{2n-9}OH$, wherein n is a positive integer less than or equal to 30); unsaturated amines resulting from replacing from replacing the —OH group(s) of the above unsaturated alcohols with —NH$_2$ group(s); functionalized diene polymers and copolymers; and combinations comprising one or more of the foregoing. In one embodiment, the compatibilizing agent comprises maleic anhydride and/or fumaric acid.

The second type of polyfunctional compatibilizing agent has both (a) a group represented by the formula (OR) wherein R is hydrogen or an alkyl, aryl, acyl or carbonyl dioxy group and (b) at least two groups each of which may be the same or different selected from carboxylic acid, acid halide, anhydride, acid halide anhydride, ester, orthoester, amide, imido, amino, and various salts thereof. Typical of this group of compatibilizing agents are the aliphatic polycarboxylic acids, acid esters, and acid amides represented by the formula:

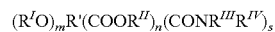

$(R^IO)_mR'(COOR^{II})_n(CONR^{III}R^{IV})_s$ wherein R' is a linear or branched chain, saturated aliphatic hydrocarbon having 2 to 20, or, more specifically, 2 to 10, carbon atoms; $R^I$ is hydrogen or an alkyl, aryl, acyl, or carbonyl dioxy group having 1 to 10, or, more specifically, 1 to 6, or, even more specifically, 1 to 4 carbon atoms; each $R^{II}$ is independently hydrogen or an alkyl or aryl group having 1 to 20, or, more specifically, 1 to 10 carbon atoms; each $R^{III}$ and $R^{IV}$ are independently hydrogen or an alkyl or aryl group having 1 to 10, or, more specifically, 1 to 6, or, even more specifically, 1 to 4, carbon atoms; m is equal to 1 and (n+s) is greater than or equal to 2, or, more specifically, equal to 2 or 3, and n and s are each greater than or equal to zero and wherein $(OR^I)$ is alpha or beta to a carbonyl group and at least two carbonyl groups are separated by 2 to 6 carbon atoms. Obviously, $R^I$, $R^{II}$, $R^{III}$, and $R^{IV}$ cannot be aryl when the respective substituent has less than 6 carbon atoms.

Suitable polycarboxylic acids include, for example, citric acid, malic acid, and agaricic acid, including the various commercial forms thereof, such as for example, the anhydrous and hydrated acids; and combinations comprising one or more of the foregoing. In one embodiment, the compatibilizing agent comprises citric acid. Illustrative of esters useful herein include, for example, acetyl citrate, monostearyl and/or distearyl citrates, and the like. Suitable amides useful herein include, for example, N,N'-diethyl citric acid amide; N-phenyl citric acid amide; N-dodecyl citric acid amide; N,N'-didodecyl citric acid amide; and N-dodecyl malic acid. Derivatives include the salts thereof, including the salts with amines and the alkali and alkaline metal salts. Examples of suitable salts include calcium malate, calcium citrate, potassium malate, and potassium citrate.

The third type of polyfunctional compatibilizing agent has in the molecule both (a) an acid halide group and (b) at least one carboxylic acid, anhydride, ester, epoxy, orthoester, or amide group, preferably a carboxylic acid or anhydride group. Examples of compatibilizing agents within this group include trimellitic anhydride acid chloride, chloroformyl succinic anhydride, chloroformyl succinic acid, chloroformyl glutaric anhydride, chloroformyl glutaric acid, chloroacetyl succinic anhydride, chloroacetylsuccinic acid, trimellitic acid chloride, and chloroacetyl glutaric acid. In one embodiment, the compatibilizing agent comprises trimellitic anhydride acid chloride.

The foregoing compatibilizing agents may be added directly to the melt blend or pre-reacted with either or both of the poly(arylene ether) and the polyamide, as well as with any other resinous materials employed in the preparation of the composition. With many of the foregoing compatibilizing agents, particularly the polyfunctional compounds, even greater improvement in compatibility is found when at least a portion of the compatibilizing agent is pre-reacted, either in the melt or in a solution of a suitable solvent; with all or a part of the poly(arylene ether). It is believed that such pre-reacting may cause the compatibilizing agent to react with and consequently functionalize the poly(arylene ether). For example, the poly(arylene ether) may be pre-reacted with maleic anhydride to form an anhydride-functionalized poly(arylene ether) that has improved compatibility with the polyamide compared to a non-functionalized poly(arylene ether).

Where a compatibilizing agent is employed in the preparation of the compatibilized polyamide-poly(arylene ether) composition, the amount used will be dependent upon the specific compatibilizing agent chosen and the specific polymeric system to which it is added. In some embodiments, the compatibilizing agent amount is about 0.1 to about 1 weight percent, specifically about 0.2 to about 0.8 weight percent, more specifically about 0.3 to about 0.6 weight percent, based on the total weight of the thermoplastic composition.

In addition to the compatibilized polyamide-poly(arylene ether) composition, the thermoplastic composition comprises about 5 to about 35 weight percent of hollow glass beads. Within the range of about 5 to about 35 weight percent, the amount of hollow glass beads can be about 10 to about 30 weight percent, specifically about 15 to about 25 weight percent. The present inventors have determined that only hollow glass beads having a relatively narrow range of diameter, density, and crush strength properties produce the desired reduction in thermal conductivity of the insulation bar. The hollow glass beads have a volume-average diameter of about 20 to about 60 micrometers, specifically about 25 to about 55 micrometers, more specifically about 30 to about 50 micrometers, still more specifically about 35 to about 45 micrometers. Volume-average diameter can be determined using conventional particle sizing techniques, including microscopy. FIG. 4 is a plot of the particle size distributions of S38HS and S38XHS hollow glass beads. Nominal average diameters of hollow glass beads supplied by 3M are determined according to test method 3M QCM 193.0. The hollow glass beads have a true density of about 0.3 to about 0.5 grams per milliliter, specifically about 0.35 to about 0.45 grams per milliliter, more specifically about 0.35 to about 0.4 grams per milliliter. The term "true density" corresponds to the density of a single glass bead and is contrasted with the bulk density of the glass beads, which is dependent on packing. Nominal true densities of hollow glass beads supplied by 3M are determined according to test method 3M QCM 14.24.1.

The hollow glass beads have an isostatic crush strength of about 30 to about 60 megapascals, specifically about 35 to about 55 megapascals, more specifically about 35 to about 50 megapascals, still more specifically about 35 to about 45 megapascals, yet more specifically about 35 to about 40 megapascals. Isostatic crush strengths can be determined according to ASTM D3102-78 (1982), "Practice for Determination of Isostatic Collapse Strength of Hollow Glass Microspheres. Nominal isostatic crush strengths of hollow glass beads supplied by 3M are determined according to test method 3M QCM 14.1.8. There are at least two reasons why, prior to the research leading to the present invention, it was not evident that hollow glass bead isostatic crush strength would be predictive of the thermal conductivity of the thermoplastic composition. First, preparation and processing of the thermoplastic composition subjects the hollow glass beads to temperatures, pressures, and shear stresses that are unlike those present in the test conditions for determination of isostatic crush strength. Second, it is unclear what process conditions are most injurious to hollow glass bead integrity. Is it the shear forces encountered during melt blending to form the thermoplastic composition, high pressures at the outlet of the melt blending step (e.g., the die face of an extruder), rapid contraction of the thermoplastic composition as it exits the melt blending apparatus and encounters a cooling medium such as air or water, high pressures during an injection molding step, or some other process condition? The answer was not clear to highly skilled thermoplastic practitioners.

Unless otherwise specified, all property values described herein are measured at 25° C.

The hollow glass beads can, optionally, be surface treated to improve their compatibility with a polyamide-containing matrix. Suitable surface treatment agents include, for example, aminosilanes, epoxysilanes, and the like. When present, the surface treatment agents are typically used in a surface area coverage of about 0.5 to about 20 monolayers.

Methods of preparing hollow glass beads are known and described, for example, in U.S. Pat. Nos. 3,700,478 to Bingham, 4,391,646 to Howell, 6,531,222 to Tanaka et al., and 6,914,024 to Anderson. Suitable hollow glass beads are also commercially available as, for example, Glass Bubbles K46, Glass Bubbles S38XHS, and Glass Bubbles S38HS, all from 3M. Surface-treated versions, including aminosilane-treated versions, of the foregoing hollow glass beads can also be used.

The thermoplastic composition comprises less than 5 weight percent of fibrous reinforcement, such as glass fibers, based on the total weight of the thermoplastic composition. In some embodiments, the fibrous reinforcement amount is less than 2 weight percent, specifically less than 1 weight percent. In some embodiments, the thermoplastic composition excludes fibrous reinforcement.

In some embodiments, the thermoplastic composition further comprises about 0.5 to about 2 weight percent, specifically about 0.8 to about 1.5 weight percent, of a low density polyethylene. In some embodiments, the thermoplastic composition further comprises about 0.02 to about 0.1 weight percent, specifically about 0.03 to about 0.08 weight percent, of a copolymer of vinylidene fluoride and hexafluoropropylene. The copolymer of vinylidene fluoride and hexafluoropropylene can have a fluorine content of about 55 to about 75 weight percent, specifically about 60 to about 70 weight percent, based on the total weight of the copolymer. In some embodiments, the copolymer of vinylidene fluoride and hexafluoropropylene comprises 50 to 70 weight percent of residues derived from vinylidene fluoride, and 30 to 50 weight percent of residues derived from hexafluoropropylene. Such fluorinated copolymers can be prepared by methods known in the art. They are also commercially available as, for example, DYNAMAR FX 9613 from Dyneon, which consists of 88-92 weight percent poly(vinylidene fluoride-co-hexafluoropropylene) having a fluorine content of 65.9±0.3% and a Mooney viscosity of 33±5, 4-9 weight percent talc, 1-4 weight percent synthetic amorphous silica, and <5% calcium carbonate. In some embodiments, the copolymer of vinylidene fluoride and hexafluoropropylene is provided in the form of a masterbatch comprising about 2 to about 10 weight percent of the copolymer of vinylidene fluoride and hexafluoropropylene and about 90 to about 98 weight percent low density polyethylene, based on the total weight of the masterbatch.

In some embodiments, the thermoplastic composition comprises about 0.5 to about 2 weight percent, specifically about 0.8 to about 1.5 weight percent, of a low density polyethylene, and about 0.02 to about 0.1 weight percent, specifically about 0.03 to about 0.08 weight percent, of a copolymer of vinylidene fluoride and hexafluoropropylene, based on the total weight of the thermoplastic composition.

The thermoplastic composition can, optionally, further comprise about 2 to about 30 weight percent of rubber-modified polystyrene, a polystyrene-poly(ethylene-butylene)-polystyrene triblock copolymer, or a combination thereof. Within the range of about 2 to about 30 weight percent, the amount can be about 4 to about 25 weight percent, specifically about 8 to about 20 weight percent, more specifically about 8 to about 15 weight percent. Rubber-modified polystyrenes and polystyrene-poly(ethylene-butylene)-polystyrene triblock copolymers are known, as are methods for their preparation. These materials are also commercially available. Suitable rubber-modified polystyrenes include the high impact polystyrene available as HIPS from Supreme Petrochem Ltd. Suitable polystyrene-poly(ethylene-butylene)-polystyrene triblock copolymers include KRATON G1651 from KRATON Polymers, having a polystyrene content of about 31 to 33 weight percent.

In some embodiments, the thermoplastic composition comprises less than or equal to 1 weight percent of or entirely excludes polymers other than those described herein as required or optional. For example, the thermoplastic composition can comprise less than or equal to 1 weight percent of or entirely exclude one or more of homopolystyrenes, unhydrogenated block copolymers of alkenyl aromatic monomers and conjugated dienes (e.g., polystyrene-polybutadiene-polystyrene triblock copolymers), and thermosetting resin (e.g., epoxy resins and thermoset polyester resins).

The thermoplastic composition can, optionally, further comprise one or more additives such as, for example, stabilizers, mold release agents, processing aids, polyamide flow promoters (for example, low molecular weight polyolefins with or without epoxy functionality, low molecular weight ethylene-propylene rubbers, low molecular weight thermoplastic polyesters, and liquid polyolefin rubbers), poly(arylene ether) flow promoters (for example, low molecular weight homopolystyrenes, and low molecular weight rubber-modified polystyrenes), flame retardants, drip retardants, nucleating agents, UV blockers, dyes, pigments, antioxidants, anti-static agents, blowing agents, mineral oil, metal deactivators, antiblocking agents, nanoclays, electrically conductive agents, and combinations thereof. In some embodiments, the thermoplastic composition excludes foaming agents and/or their residue. In some embodiments, the thermoplastic composition comprises less than 0.1 weight percent of or entirely excludes flame retardants. Flame retardants include, for example, brominated polymers (such as brominated polystyrene), metal diallyl phosphinates (such as aluminum tris(diethylphosphinate)), metal hydroxides (such as magnesium hydroxide), and aromatic phosphate esters (such as resorcinol bis(diphenyl phosphate) and bisphenol A bis(diphenyl phosphate)). Electrically conductive agents include, for example, electrically conductive carbon black, carbon nanotubes, carbon fibers or a combination of two or more of the foregoing. Electrically conductive carbon blacks are commercially available and are sold under a variety of trade names, including but not limited to S.C.F. (Super Conductive Furnace), E.C.F. (Electric Conductive Furnace), KETJENBLACK EC (available from Akzo Co., Ltd.), PRINTEX XE2B (available from Degussa), ENSACO 350G (available from Timcal), or acetylene black. In some embodiments the electrically conductive carbon black has an average particle size less than or equal to 200 nanometers (nm), or, more specifically, less than or equal to 100 nm, or, even more specifically, less than or equal to 50 nm. The electrically conductive carbon blacks may also have surface areas greater than 200 square meter per gram ($m^2/g$), or, more specifically, greater than 400 $m^2/g$, or, even more specifically, greater than 900 $m^2/g$ as determined by BET analysis. The electrically conductive carbon black may have a pore volume greater than or equal to 40 cubic centimeters per hundred grams ($cm^3/100$ g), or, more specifically, greater than or equal to 100 $cm^3/100$ g, or, even more specifically, greater than or equal to 150 $cm^3/100$ g, as determined by dibutyl phthalate absorption.

The thermoplastic composition is prepared by melt blending the polyamide, the poly(arylene ether), the hollow glass beads, and any optional components. In order to minimize crushing of hollow glass beads, they are preferably added as late as possible in the compounding process while still ensuring their uniform distribution in the composition. In some embodiments, the thermoplastic compositions except for the hollow glass beads is compounded and pelletized in a first compounding step, and the resulting (unfilled) composition is subsequently compounded with the hollow glass beads in a second compounding step. In other embodiments, the entire thermoplastic composition is compounded and pelletized, and the pellets are used for a subsequent profile extrusion process to form the insulation bar. In still other embodiments, the thermoplastic composition is compounded and subjected to immediate profile extrusion, without intermediate pelletization. Detailed compounding conditions are described in the working examples below.

An important property of the thermoplastic composition is its low thermal conductivity. In some embodiments, the thermoplastic composition has a thermal conductivity less than or equal to 0.24 watts per meter-Kelvin, measured according to ASTM E 1530-06 at 50° C. using a disc measuring 40 millimeters in diameter and 3.4 millimeters in thickness.

The thermal conductivity can be less than 0.22 per meter-Kelvin, or less than 0.2 watts per meter-Kelvin, or less than 0.19 watts per meter-Kelvin. In some embodiments, the thermoplastic composition has a thermal conductivity of about 0.16 to about 0.24 watts per meter-Kelvin. Within this range, the thermal conductivity can be about 0.17 to about 0.22 watts per meter-Kelvin, specifically about 0.18 to about 0.2 watts per meter-Kelvin, more specifically about 0.185 to about 0.19 watts per meter-Kelvin.

Another important property of the thermoplastic composition is its relatively low density. In some embodiments, wherein the thermoplastic composition has a density at 25° C. less than or equal to 1 gram per milliliter. In some embodiments, the density is less than 0.95 gram per milliliter, or less than 0.9 gram per milliliter, or less than 0.85 gram per milliliter. In some embodiments, the thermoplastic composition has a density of about 0.8 to about 1 gram per milliliter. Within this range, the density can be about 0.82 to about 0.9 gram per milliliter, specifically about 0.83 to about 0.85 gram per milliliter.

Profile extrusion can be used to form an insulation bar from the thermoplastic composition. The insulation bar can be hollow with a wall thickness of about 0.2 to about 4 millimeters. Within this range, the wall thickness can be about 0.3 to about 2 millimeters, specifically about 0.4 to about 1 millimeter, more specifically about 0.4 to about 0.8 millimeter.

The thermally insulated structural member can be assembled by sliding the insulation bar(s) into the frame.

In a very specific embodiment of the thermally insulated structural member, the insulation bar comprises a wall having a thickness of about 0.2 to about 4 millimeters; the compatibilized polyamide-poly(arylene ether) composition is the product of melt blending components comprising about 32 to about 45 weight percent of the poly(arylene ether); wherein the poly(arylene ether) comprises a poly(2,6-dimethyl-1,4- phenylene ether) having an intrinsic viscosity of about 0.3 to about 0.6 deciliter per gram, measured at 25° C. in chloroform, about 32 to about 45 weight percent of the polyamide; wherein the polyamide comprises a polyamide-6,6, about 0.15 to about 2 weight percent of a compatibilizing agent for the poly(2,6-dimethyl-1,4-phenylene ether) and the polyamide-6,6, and about 15 to about 25 weight percent of the hollow glass beads; and the thermoplastic composition has a thermal conductivity less than or equal to 0.2 watts per meter-Kelvin, measured according to ASTM E 1530-06 at 50° C. using a disc measuring 40 millimeters in diameter and 3.4 millimeters in thickness. In some embodiments, the thermoplastic composition has a thermal conductivity of about 0.16 to 0.2 watts per meter-Kelvin. In some embodiments, the melt blended components further comprise about 3 to about 13 weight percent of rubber-modified polystyrene. In some embodiments, the melt blended components further comprise about 0.5 to about 2 weight percent of a low density polyethylene and about 0.02 to about 0.1 weight percent of a copolymer of vinylidene fluoride and hexafluoropropylene.

One embodiment is a thermoplastic composition comprising about 55 to about 95 weight percent of a compatibilized polyamide-poly(arylene ether) composition, and about 5 to about 45 weight percent of hollow glass beads, wherein the hollow glass beads have a volume-average diameter of about 20 to about 60 micrometers; a true density of about 0.3 to about 0.5 grams per milliliter, and an isostatic crush strength of about 30 to about 60 megapascals; wherein the thermoplastic composition comprises less than 5 weight percent of fibrous reinforcement. In a very specific embodiment, the compatibilized polyamide-poly(arylene ether) composition is the product of melt blending components comprising about 32 to about 45 weight percent of a poly(arylene ether) comprising a poly(2,6-dimethyl-1,4-phenylene ether) having an intrinsic viscosity of about 0.3 to about 0.6 deciliter per gram measured at 25° C. in chloroform, about 32 to about 45 weight percent of a polyamide comprising a polyamide-6,6, about 0.15 to about 2 weight percent of a compatibilizing agent for the poly(2,6-dimethyl-1,4-phenylene ether) and the polyamide-6,6, and about 15 to about 25 weight percent of the hollow glass beads, and the thermoplastic composition has a thermal conductivity less than or equal to 0.2 watts per meter-Kelvin, measured according to ASTM E 1530 at 50° C. using a disc measuring 40 millimeters in diameter and 3.4 millimeters in thickness. Other embodiments include injection molded and extruded articles fabricated from the thermoplastic composition.

One embodiment is a method of reducing the thermal conductivity of a thermally insulated structural member for a door or window, comprising: at least partially enclosing in a metal frame an insulation bar comprising a thermoplastic composition comprising about 55 to about 95 weight percent of a compatibilized polyamide-poly(arylene ether) composition, and about 5 to about 45 weight percent of hollow glass beads, wherein the hollow glass beads have a true density of about 0.3 to about 0.5 grams per milliliter, and an isostatic crush strength of about 30 to about 60 megapascals; wherein the thermoplastic composition comprises less than 5 weight percent of fibrous reinforcement. All of the variations described above in the context of the structural member can also be applied to the method of reducing thermal conductivity.

The invention includes at least the following embodiments.

Embodiment 1: A thermally insulated structural member for a door or window, comprising: a frame comprising a metal; and an insulation bar at least partially enclosed by the frame; wherein the insulation bar comprises a thermoplastic composition comprising about 55 to about 95 weight percent of a compatibilized polyamide-poly(arylene ether) composition, and about 5 to about 45 weight percent of hollow glass beads, wherein the hollow glass beads have a volume-average diameter of about 20 to about 60 micrometers, a true density of about 0.3 to about 0.5 grams per milliliter, and an isostatic crush strength of about 30 to about 60 megapascals; wherein the thermoplastic composition comprises less than weight percent of fibrous reinforcement.

Embodiment 2: The thermally insulated structural member of embodiment 1, wherein the thermoplastic composition has a thermal conductivity less than or equal to 0.24 watts per meter-Kelvin, measured according to ASTM E 1530 at 50° C. using a disc measuring 40 millimeters in diameter and 3.4 millimeters in thickness.

Embodiment 3: The thermally insulated structural member of embodiment 1 or 2, wherein the thermoplastic composition has a thermal conductivity of about 0.16 to about 0.24 watts per meter-Kelvin, measured according to ASTM E 1530 at 50° C. using a disc measuring 40 millimeters in diameter and 3.4 millimeters in thickness.

Embodiment 4: The thermally insulated structural member of any of embodiments 1-3, wherein the thermoplastic composition has a density at 25° C. less than or equal to 1 gram per milliliter.

Embodiment 5: The thermally insulated structural member of any of embodiments 1-4, wherein the thermoplastic composition has a density at 25° C. of about 0.8 to about 1 gram per milliliter.

Embodiment 6: The thermally insulated structural member of any of embodiments 1-5, wherein the poly(arylene ether) has an intrinsic viscosity of about 0.3 to about 0.6 deciliter per gram, measured at 25° C. in chloroform.

Embodiment 7: The thermally insulated structural member of any of embodiments 1-6, wherein the compatibilized polyamide-poly(arylene ether) composition comprises the poly(arylene ether) and the polyamide in a weight ratio of about 0.5:1 to about 1.2:1.

Embodiment 8: The thermally insulated structural member of any of embodiments 1-7, wherein the thermoplastic composition further comprises about 0.5 to about 2 weight percent of a low density polyethylene.

Embodiment 9: The thermally insulated structural member of any of embodiments 1-8, wherein the thermoplastic composition further comprises about 0.02 to about 0.1 weight percent of a copolymer of vinylidene fluoride and hexafluoropropylene.

Embodiment 10: The thermally insulated structural member of any of embodiments 1-9, wherein the thermoplastic composition further comprises about 0.5 to about 2 weight percent of a low density polyethylene, and about 0.02 to about 0.1 weight percent of a copolymer of vinylidene fluoride and hexafluoropropylene.

Embodiment 11: The thermally insulated structural member of any of embodiments 1-10, wherein the thermoplastic composition further comprises about 2 to about 30 weight percent of rubber-modified polystyrene, polystyrene-poly(ethylene-butylene)-polystyrene triblock copolymer, or a combination thereof.

Embodiment 12: The thermally insulated structural member of any of embodiments 1-11, wherein the hollow glass beads comprise a surface coating comprising an aminosilane.

Embodiment 13: The thermally insulated structural member of any of embodiments 1-12, wherein the insulation bar comprises a wall having a thickness of about 0.2 to about 4 millimeters.

Embodiment 14: The thermally insulated structural member of embodiment 1, wherein the insulation bar comprises a wall having a thickness of about 0.2 to about 4 millimeters;

wherein the compatibilized polyamide-poly(arylene ether) composition is the product of melt blending components comprising about 32 to about 45 weight percent of the poly (arylene ether); wherein the poly(arylene ether) comprises a poly(2,6-dimethyl-1,4-phenylene ether) having an intrinsic viscosity of about 0.3 to about 0.6 deciliter per gram, measured at 25° C. in chloroform, about 32 to about 45 weight percent of the polyamide; wherein the polyamide comprises a polyamide-6,6, about 0.15 to about 2 weight percent of a compatibilizing agent for the poly(2,6-dimethyl-1,4-phenylene ether) and the polyamide-6,6, and about 15 to about 25 weight percent of the hollow glass beads; and wherein the thermoplastic composition has a thermal conductivity less than or equal to 0.2 watts per meter-Kelvin, measured according to ASTM E 1530 at 50° C. using a disc measuring 40 millimeters in diameter and 3.4 millimeters in thickness.

Embodiment 15: The thermally insulated structural member of embodiment 14, wherein the thermoplastic composition has a thermal conductivity of about 0.16 to 0.2 watts per meter-Kelvin.

Embodiment 16: The thermally insulated structural member of embodiment 14 or 15, wherein the melt blended components further comprise about 3 to about 13 weight percent of rubber-modified polystyrene.

Embodiment 17: The thermally insulated structural member of any of embodiments 14-16, wherein the melt blended components further comprise about 0.5 to about 2 weight percent of a low density polyethylene and about 0.02 to about 0.1 weight percent of a copolymer of vinylidene fluoride and hexafluoropropylene.

Embodiment 18: A window comprising the thermally insulated structural member of embodiment 1.

Embodiment 19: A door comprising the thermally insulated structural member of embodiment 1.

Embodiment 20: A method of reducing the thermal conductivity of a thermally insulated structural member for a door or window, comprising: at least partially enclosing in a metal frame an insulation bar comprising a thermoplastic composition comprising about 55 to about 95 weight percent of a compatibilized polyamide-poly(arylene ether) composition, and about 5 to about 45 weight percent of hollow glass beads, wherein the hollow glass beads have a volume-average diameter of about 20 to about 60 micrometers, a true density of about 0.3 to about 0.5 grams per milliliter, and an isostatic crush strength of about 30 to about 60 megapascals; wherein the thermoplastic composition comprises less than 5 weight percent of fibrous reinforcement.

The invention is further illustrated by the following non-limiting examples.

Examples 1-6, Comparative Examples 1-7

These examples illustrates the effects on the final composition of the properties of the hollow glass beads, including density, crush strength, and particle size.

Compositions were prepared using the components described in Table 1.

TABLE 1

| Component | Description |
|---|---|
| PPE | Poly (2,6-dimethyl-1,4-phenylene ether) having an intrinsic viscosity of 0.58 deciliter/gram; available from SABIC Innovative Plastics. |
| PA66 | Polyamide-6,6 having an intrinsic viscosity of about 2.19 to 2.40 deciliter/gram as measured in formic acid, and an amine end group content of about 36 to 42 milliequivalents/kilogram; available from Rhodia. |
| SEBS | Polystyrene-poly(ethylene-butylene)-polystyrene triblock copolymer having a polystyrene content of about 31 to 33 weight percent; available as KRATON G1651 from KRATON Polymers. |
| HIPS | High impact polystyrene; available as HIPS from Supreme Petrochem Ltd. |
| iM30K | Hollow glass beads having a true density of 0.60 gram/milliliter measured according to 3M QCM 14.24.1, an isostatic crush strength of about 193 megapascals (about 28,000 pounds per square inch) measured according to 3M QCM 14.1.8, and an average diameter of about 18 micrometers, measured according to 3M QCM 193.0; available as Glass Bubbles iM30K from 3M |
| S60HS | Hollow glass beads having a true density of 0.60 gram/milliliter measured according to 3M QCM 14.24.1, an isostatic crush strength of about 124 megapascals (about 18,000 pounds per square inch) measured according to 3M QCM 14.1.8, and an average diameter of about 30 micrometers measured according to 3M QCM 193.0; available as Glass Bubbles S60HS from 3M. |
| K46 | Hollow glass beads having a true density of 0.46 gram/milliliter measured according to 3M QCM 14.24.1, an isostatic crush strength of about 41 megapascals (about 6,000 pounds per square inch) measured according to 3M QCM 14.1.8, and an average diameter of about 40 micrometers measured according to 3M QCM 193.0; available as Glass Bubbles K46 from 3M. |
| Treated K46 | Aminosilane-treated hollow glass beads having a true density of 0.46 gram/milliliter measured according to 3M QCM 14.24.1, an isostatic crush strength of about 41 megapascals (about 6,000 pounds per square inch) measured according to 3M QCM 14.1.8, and an average diameter of about 40 micrometers measured according to 3M QCM 193.0. |
| S38XHS | Hollow glass beads having a true density of 0.38 grams/milliliter measured according to 3M QCM 14.24.1, an isostatic crush strength of about 38 megapascals (about 5,500 pounds per square inch), and an average diameter of about 35 micrometers measured according to 3M QCM 193.0; available as Glass Bubbles S60XHS from 3M. |
| Treated S38XHS | Aminosilane-treated hollow glass beads having a true density of 0.38 grams/milliliter measured according to 3M QCM 14.24.1, an isostatic crush strength of about 38 megapascals (about 5,500 pounds per square inch), and an average diameter of about 35 micrometers measured according to 3M QCM 193.0. |

TABLE 1-continued

| Component | Description |
| --- | --- |
| S38HS | Hollow glass beads having a true density of 0.38 grams/milliliter measured according to 3M QCM 14.24.1, an isostatic crush strength of about 38 megapascals (about 5,500 pounds per square inch), and an average diameter of about 44 micrometers measured according to 3M QCM 193.0; available as Glass Bubbles S38HS from 3M. |
| Treated S38HS | Aminosilane-treated hollow glass beads having a true density of 0.38 grams/milliliter measured according to 3M QCM 14.24.1, an isostatic crush strength of about 38 megapascals (about 5,500 pounds per square inch), and an average diameter of about 44 micrometers measured according to 3M QCM 193.0. |
| K25 | Hollow glass beads having a true density of 0.25 grams/milliliter measured according to 3M QCM 14.24.1, an isostatic crush strength of about 5 megapascals (about 750 pounds per square inch), and an average diameter of about 55 micrometers measured according to 3M QCM 193.0; available as Glass Bubbles K25 from 3M. |
| CIL 30 | Hollow ceramic spheres having a chemical composition of 52-60% SiO2, 32-36% Al2O3, 1.2-3.2% K2O, 1-2% Fe2O3, 0.8-1.3% TiO2, 1-2.5% MgO, 0.2-0.6% Na2O, and 0.1-0.5% CaO; and having a density of about 0.65 to 0.75 grams/milliliter, an isostatic crush strength of about 18 to 27 megapascals, and a particle size distribution with 3-10 weight percent particles smaller than 63 micrometers, 70-90 weight percent particles greater than 106 micrometers, 40-70 weight percent particles greater than 150 micrometers, 3-7 weight percent particles greater than 250 micrometers, and less than or equal to 1 weight percent particles greater than 500 micrometers; available as CIL 30 from Cenosphere, India. |
| Citric acid | Citric acid from SD Fine Chemicals Ltd. |
| LDPE/Dynamar | Pre-compounded blend of 95 weight percent low density polyethylene (obtained as PA0833LD from Constab) and 5 weight percent fluoropolymer (obtained as DYNAMAR FX9613 from 3M) |
| Carbon black | Carbon black obtained as ELFTEX 470 from Cabot |
| Stabilizer | A 50:50 weight/weight mixture of cuprous iodide and a 50 weight percent aqueous solution of potassium iodide (i.e., 50 weight percent cuprous iodide, 25 weight percent potassium iodide, and 25 weight percent water) |

Compounding of the blends was conducted in two steps. In the first step, a poly(arylene ether)-polyamide blend was made in a 23-millimeter, three-lobe, co-rotating twin-screw extruder from Krupp Werner & Pfleiderer. To the feedthroat of the extruder were added poly(arylene ether), stabilizer, carbon black, LDPE/Dynamar, and citric acid. Polyamide was added downstream. The extruder utilized barrel temperatures of 150 to 300° C. The throughput was about 15 to 20 kilograms per hour with the screw rotating at 400 rotations per minute and a vacuum of 100 to 500 millibars applied to the melt at the last barrel of the extruder. The torque was maintained at about 60 to 65%.

In the second step, the compounded blend made in first step was added in the main throat and the hollow glass beads were added downstream. This compounding was conducted using a 25-millimeter, two-lobe, co-rotating twin-screw extruder from Krupp Werner & Pfleiderer. The extruder utilized barrel temperatures of 150 to 300° C. The throughput was 8 to 10 kilograms per hour with the screw rotating at 150 to 300 rotations per minute (rpm) and a vacuum of 100 to 500 millibar applied to the melt at the next-to-last barrel of the extruder. The torque was maintained at about 40 to 50%. The extrudate was pelletized.

The pellets were then dried at 120° C. for five hours in a forced air-circulating oven and molded into test bars. Test bars were molded using an injection molding machine with barrels set at 40 to 300° C. and a mold temperature set at 100° C.

Thermal conductivity values, expressed in units of watts per Kelvin per meter (W/mK), were measured according to the guarded heat flow method described in ASTM E1530-06 using a TCA 446/3 instrument obtained from NETZSCH, USA. A disc measuring 40 mm in diameter and 3.4 min in thickness was used as a sample for the thermal conductivity measurement. The sample was kept in a polyethylene zip lock bag and conditioned for 48 hours at 23° C. and 50% relative humidity. A sample and a heat flux transducer (HFT) were sandwiched between two flat plates controlled at different temperatures so that the temperature difference across the sample was about 20° C., to produce a heat flow through the sample. A reproducible load (30 pounds per square inch; 207 kilopascals) was applied to the sample by pneumatic or other means, to ensure that there was a reproducible contact resistance between the specimen and plate surfaces. A guard surrounds the test stack and is maintained at a uniform mean temperature (about 50-54° C.), in order to minimize lateral heat flow to and from the stack. The average temperature of the sample is about 50° C. At steady state, the difference in temperature between the surfaces contacting the specimen is measured with temperature sensors embedded in the surfaces, together with the electrical output of the HFT. This output (voltage) is proportional to the heat flow through the specimen, the HFT and the interfaces between the specimen and the apparatus. The proportionality is obtained through prior calibration of the system with reference specimens (Vespel, is a product and trademark of DuPont, Wilmington, Del., of known thermal conductivity of about 0.38 W/mK at 50° C.) measured under the same conditions, such that contact resistance at the surfaces is made reproducible.

Density (in units of grams/milliliter) was measured on compounded pellet as well as molded parts by gas pycnometer. Density difference, which is the difference in experimental density measured by gas pycnometer and theoretical density, is a proportional to the breakage of hollow glass beads. Density difference was determined for both pellets of the extruded composition, and molded parts. Theoretical density is calculated by the mixture rule according to the equation $$\rho_{composite} = V_{HMC} \times \rho_{HMC} + V_{matrix} \times \rho_{matrix}$$

where $\rho_{composite}$ is the density of the composite, $V_{HMC}$ is the volume fraction of the hollow glass beads, $\rho_{HMC}$ is the density of the hollow glass beads, $V_{matrix}$ is volume fraction of the polymeric matrix, and $\rho_{matrix}$ is the density of the polymeric matrix. The pellets were charred at 550° C. for 12 hours in the furnace to find out the actual amount of hollow glass beads fed into the extruder during compounding.

Domain particle size was analyzed by transmission electron microscopy (TEM) with a Philips CM12 transmission electron microscope operated at 120 kilovolts. Micrographs of typical microstructures were taken at a magnification of 9700x. One hundred nanometer thick sections required for TEM studies were prepared by ultramicrotomy at room temperature. These sections were collected on a 3 millimeter, 400 mesh copper TEM grid. TEM sections used to study the disperse phase were vapor stained with ruthenium tetroxide ($RuO_4$) solution for 30 seconds. In a compatibilized polyamide-poly(arylene ether) composition, ruthenium tetroxide preferentially stains poly(arylene ether).

The residual ash samples were taken and dispersed on a scanning electron microscopy (SEM) stub to study the hollow glass bead morphology. The distributed residual samples with the SEM stub were coated with gold in order to make them electron conductive. The coated samples were inserted in SEM (FEI quanta 400) and imaged at different magnifications in back scattered mode. The SEM images recorded from different samples were used to rank the samples in increasing/decreasing degree of breakage, after a visual examination of the images.

Compositions and properties are summarized in Tables 2-4. The amount of each component is expressed in weight percent based on the total weight of the composition. Hollow glass bead crush strengths, expressed in units of megapascals (MPa), are isostatic crush strengths as reported by the manufacturer and correspond to pressures at which at least 80% of the hollow glass beads survive and about 90% of the hollow glass beads typically survive. Hollow glass bead true densities, expressed in units of grams per cubic centimeter (g/cc), are as reported by the manufacturer. Char values, expressed in weight percent (wt %), represent the actual amount hollow glass beads present in the pellets. The pellets were burnt in the furnace at 550° C. for 12 hours to remove the polymer or any other organic matter. Determinations of thermal conductivity, pellet density, pellet density difference, and molded part density difference are described above.

In Table 2, Comparative Examples 1-7 and Examples 1-6 show the importance of crush strength, density of hollow glass beads, and particle size distribution on the thermal conductivity and final density of the pellets. Comparative Example 1 is a composition without hollow glass beads. A comparison of Comparative Example 1 without hollow glass beads and Examples 1-6 with hollow glass beads shows that the addition of hollow glass beads is accompanied by desirable decreases in thermal conductivity and density. Comparing Examples 1-3, incorporating hollow glass beads having crush strengths of 38 to 41 megapascals and true densities of 0.38 to 0.46 grams/milliliter, with Comparative Examples 4 and 5, incorporating hollow glass beads having crush strengths of 4 to 27 megapascals and true densities of 0.25 to 0.8 grams/milliliter, shows that Examples 1-3 exhibit desirably lower densities and thermal conductivities. The observation that the use of more dense hollow glass beads in Examples 1-3 produced a less dense final composition is believed to be due to reduced breakage of hollow glass beads. Note that the difference between actual and theoretical density of pellets ranges from ≤0.005 to 0.184 gram per milliliter, with larger values indicating greater breakage of hollow glass beads. Note also that the difference between actual and theoretical densities of molded discs ranges from ≤0.005 to 0.239 gram per milliliter, with larger values indicating greater breakage of hollow glass beads. The fact that density differences for molded parts are greater than those for pellets suggests that some breakage of hollow glass beads occurs in the compounding and pelletizing steps, and additional breakage of hollow glass beads occurs in the injection molding steps. For parts formed by extrusion molding, the extent of breakage of hollow glass beads is likely to more closely resemble that observed in pellets than that observed in A comparison of Examples 4-6 with Comparative Example 6 further illustrates the importance of the density of hollow glass beads apart from crush strength. Although the Comparative Example 6 S60HS hollow glass beads have a higher crush strength than the S38XHS, S38HS, and K46 hollow glass beads of Examples 4-6, they produce a more thermally conductive (less desirable) final composition.

TABLE 2

|  | C. Ex. 1 | C. Ex. 2 | C. Ex. 3 | C. Ex. 4 |
|---|---|---|---|---|
| COMPOSITIONS | | | | |
| PPE | 50 | — | — | — |
| PA66 | 49.55 | — | — | — |
| Citric acid | 0.45 | — | — | — |
| C. Ex. 1 | — | 90 | 90 | 90 |
| SEBS | 0 | 0 | 0 | 0 |
| HIPS | 0 | 0 | 0 | 0 |
| iM30K | 0 | 10 | 0 | 0 |
| S60HS | 0 | 0 | 10 | 0 |
| K46 | 0 | 0 | 0 | 0 |
| S38XHS | 0 | 0 | 0 | 0 |
| S38HS | 0 | 0 | 0 | 0 |
| K25 | 0 | 0 | 0 | 10 |
| CIL 30 | 0 | 0 | 0 | 0 |
| PROPERTIES | | | | |
| Hollow glass bead crash strength (MPa) | — | 172 | 124 | 5 |
| Hollow glass bead true density (g/mL) | — | 0.60 | 0.60 | 0.25 |
| Char (wt %) | 0 | 8.16 | 9.6 | 9.4 |
| Thermal conductivity at 50° C. (W/mK) | 0.235 | 0.227 | 0.221 | 0.23 |
| Density of pellet (g/cc) | 1.11 | 1.03 | 1.03 | 1.02 |
| Density difference for pellet (Expt. − Calc.) | ≤0.005 | 0.012 | ≤0.005 | 0.184 |
| Density difference for molded part (Expt. − Calc.) | ≤0.005 | 0.032 | 0.027 | 0.239 |

TABLE 2-continued

|  | C. Ex. 5 | C. Ex. 6 | C. Ex. 7 | Ex. 1 |
|---|---|---|---|---|
| COMPOSITIONS | | | | |
| PPE | — | — | — | — |
| PA66 | — | — | — | — |
| Citric acid | — | — | — | — |
| C. Ex. 1 | 90 | 80 | 80 | 90 |
| SEBS | 0 | 0 | 0 | 0 |
| HIPS | 0 | 0 | 0 | 0 |
| iM30K | 0 | 0 | 0 | 0 |
| S60HS | 0 | 20 | 0 | 0 |
| K46 | 0 | 0 | 0 | 10 |
| S38XHS | 0 | 0 | 0 | 0 |
| S38HS | 0 | 0 | 0 | 0 |
| K25 | 0 | 0 | 0 | 0 |
| CIL 30 | 10 | 0 | 20 | 0 |
| PROPERTIES | | | | |
| Hollow glass bead crush strength (MPa) | 20 | 124 | 20 | 41 |
| Hollow glass bead true density (g/mL) | 0.8 | 0.6 | 0.8 | 0.46 |
| Char (wt %) | 9.2 | 18.7 | 20.8 | 9.6 |
| Thermal conductivity at 50° C. (W/mK) | 0.236 | 0.222 | 0.261 | 0.215 |
| Density of pellet (g/cc) | 1.09 | 0.97 | 1.11 | 0.993 |
| Density difference for pellet (Expt. − Calc.) | 0.017 | ≤0.005 | 0.090 | ≤0.005 |
| Density difference for molded part (Expt. − Calc.) | 0.065 | 0.030 | 0.150 | 0.040 |

|  | Ex. 2 | Ex. 3 | Ex. 4 | Ex. 5 | Ex. 6 |
|---|---|---|---|---|---|
| COMPOSITIONS | | | | | |
| PPE | — | — | — | — | — |
| PA66 | — | — | — | — | — |
| Citric acid | — | — | — | — | — |
| C. Ex. 1 | 90 | 90 | 80 | 80 | 80 |
| SEBS | 0 | 0 | 0 | 0 | 0 |
| HIPS | 0 | 0 | 0 | 0 | 0 |
| iM30K | 0 | 0 | 0 | 0 | 0 |
| S60HS | 0 | 0 | 0 | 0 | 0 |
| K46 | 0 | 0 | 20 | 0 | 0 |
| S38XHS | 10 | 0 | 0 | 20 | 0 |
| S38HS | 0 | 10 | 0 | 0 | 20 |
| K25 | 0 | 0 | 0 | 0 | 0 |
| CIL 30 | 0 | 0 | 0 | 0 | 0 |
| PROPERTIES | | | | | |
| Hollow glass bead crush strength (MPa) | 38 | 38 | 41 | 38 | 38 |
| Hollow glass bead true density (g/mL) | 0.38 | 0.38 | 0.46 | 0.38 | 0.38 |
| Char (wt %) | 7.7 | 10 | 18.2 | 16.2 | 18.3 |
| Thermal conductivity at 50° C. (W/mK) | 0.214 | 0.209 | 0.21 | 0.194 | 0.208 |
| Density of pellet (g/cc) | 1.00 | 0.98 | 0.97 | 0.90 | 0.91 |
| Density difference for pellet (Expt. − Calc.) | 0.072 | 0.040 | 0.052 | 0.084 | 0.104 |
| Density difference for molded part (Expt. − Calc.) | 0.087 | 0.099 | 0.097 | 0.115 | 0.154 |

Transmission electron micrographs of (a) Comparative Example 1 and (b) Example 5 are shown in FIG. 5. The continuous light gray phase corresponds to a continuous phase comprising polyamide, and the discrete dark phase corresponds to a dispersed phase comprising poly(arylene ether). The micrograph shows the stability of disperse phase on addition of hollow glass beads. The oval shapes in each image correspond to particles of the dispersed poly(arylene ether) phase (the glass beads are not visible in FIG. 5(b) because each glass bead is much larger than the field of the image).

Figure 6:
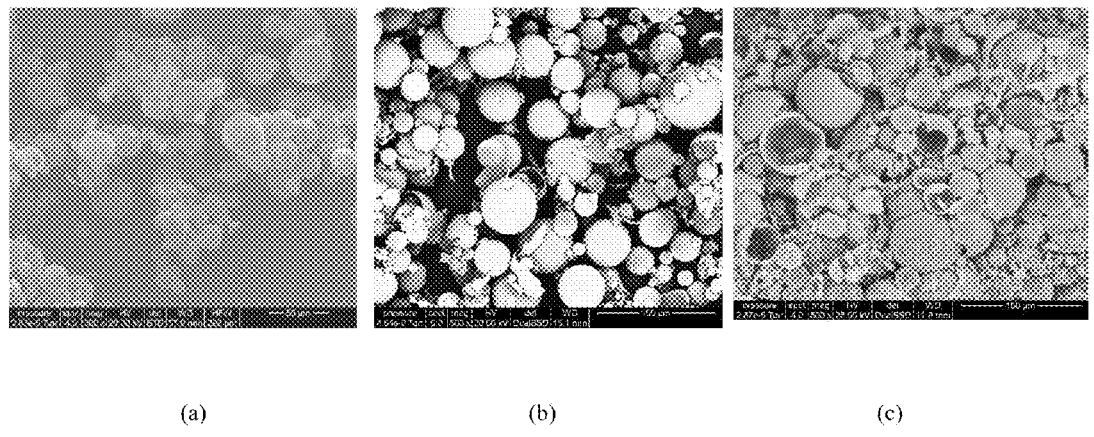
FIG. 6 consists of scanning electron micrographs for sections of pellets after charring at 550° C.; the samples vary in the type of hollow glass beads, with image (a) corresponding to a sample incorporating S60HS hollow glass beads, image (b) corresponding to a sample incorporating S38XHS hollow glass beads, and image (c) corresponding to a sample incorporating K25 hollow glass beads.

FIG. 6 shows scanning electron micrographs of sections of pellets charred at 550° C. for (a) Comparative Example 3 with 10 weight percent S60HS hollow glass beads, (b) Example 2 with 10 weight percent S38XHS hollow glass beads, and (c) Comparative Example 4 with 10 weight percent K25 hollow glass beads. The images show there is severe breakage of K25 compared to S60HS and S38XHS.

Figure 7:
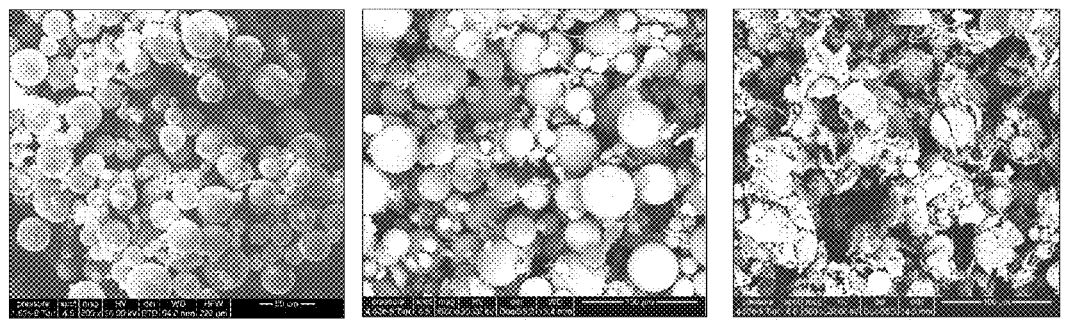
FIG. 7 consists of scanning electron micrographs for sections of molded parts after charring at 550° C.; the samples vary in the type of hollow glass beads, with image (a) corresponding to a sample incorporating S60HS hollow glass beads, image (b) corresponding to a sample incorporating S38XHS hollow glass beads, and image (c) corresponding to a sample incorporating K25 hollow glass beads.

FIG. 7 shows scanning electron micrographs of sections of molded parts charred at 550° C. for (a) Comparative Example 3 with 10 weight percent S60HS hollow glass beads, (b) Example 2 with 10 weight percent S38XHS hollow glass beads, and (c) Comparative Example 4 with 10 weight percent K25 hollow glass beads. The images show there is severe breakage of K25 compared to S60HS and S38XHS.

Examples 7-12

Comparative Example 1 and Examples 7-12 as shown in Table 3 demonstrate the effect of hollow glass beads on mechanical and thermal properties as well as the benefit of surface treatment on the mechanical properties.

In Table 3, values of "Density difference for molded part (Expt.−Calc.)" were determined as described above. Values of tensile modulus, expressed in units of gigapascals (GPa), and tensile strength, expressed in units of megapascals (MPa), and tensile strain at break, expressed in units of percent (%), were measured at 23° C. according to ISO 527.

Values of notched Izod impact strength were measured at 23° C. according to ISO 180/1A. Heat resistance in ° C. (Vicat B) was measured according to ISO 306.

with higher tensile strength and higher tensile elongation at break than exhibited by the corresponding compositions in which the hollow glass beads are not surface treated.

TABLE 3

| | C. Ex. 1 | Ex. 7 | Ex. 8 | C. Ex. 9 |
|---|---|---|---|---|
| COMPOSITIONS | | | | |
| PPE | 50 | — | — | — |
| PA66 | 49.55 | — | — | — |
| Citric acid | 0.45 | — | — | — |
| C. Ex. 1 | — | 80 | 80 | 80 |
| K46 | 0 | 20 | 0 | 0 |
| Treated K46 | 0 | 0 | 20 | 0 |
| S38XHS | 0 | 0 | 0 | 20 |
| Treated S38XHS | 0 | 0 | 0 | 0 |
| S38HS | 0 | 0 | 0 | 0 |
| Treated S38HS | 0 | 0 | 0 | 0 |
| PROPERTIES | | | | |
| Hollow glass bead crash strength (MPa) | — | 6000 | 6000 | 5500 |
| Hollow glass bead true density (g/mL) | — | 0.46 | 0.46 | 0.38 |
| Char (wt %) | — | 18.2 | 17.6 | 16.2 |
| Thermal conductivity at 50° C. (W/mK) | 0.235 | 0.21 | 0.22 | 0.194 |
| Density of pellet (g/cc) | 1.11 | 0.97 | 0.94 | 0.90 |
| Density difference for pellet (Expt. − Calc.) | ≤0.005 | 0.052 | 0.048 | 0.084 |
| Density difference for molded part (Expt. − Calc.) | ≤0.005 | 0.097 | 0.18 | 0.115 |
| Tensile modulus (GPa) | 2.6 | 3.25 | 3.35 | 3.1 |
| Tensile strength (MPa) | 55.2 | 50 | 73 | 52 |
| Nominal strain at break (%) | 18 | 2.8 | 5 | 2.7 |
| Notched Izod impact strength (kJ/m2) | 5 | 1.9 | 4 | 2 |
| Flow CTE (m/m/C) × $10^{-5}$ | 10.2 | — | — | 7 |
| Cross flow CTE (m/m/C) × $10^{-5}$ | 10 | — | — | 7 |

| | Ex. 10 | Ex. 11 | Ex. 12 |
|---|---|---|---|
| COMPOSITIONS | | | |
| PPE | — | — | — |
| PA66 | — | — | — |
| Citric acid | — | — | — |
| C. Ex. 1 | 80 | 80 | 80 |
| K46 | 0 | 0 | 0 |
| Treated K46 | 0 | 0 | 0 |
| S38XHS | 0 | 0 | 0 |
| Treated S38XHS | 20 | 0 | 0 |
| S38HS | 0 | 20 | 0 |
| Treated S38HS | 0 | 0 | 20 |
| PROPERTIES | | | |
| Hollow glass bead crush strength (MPa) | 5500 | 5500 | 5500 |
| Hollow glass bead true density (g/mL) | 0.38 | 0.38 | 0.38 |
| Char (wt %) | 13.2 | 18.3 | 15.6 |
| Thermal conductivity at 50° C. (W/mK) | 0.208 | 0.208 | 0.217 |
| Density of pellet (g/cc) | 0.91 | 0.91 | 0.93 |
| Density difference for pellet (Expt. − Calc.) | 0.025 | 0.104 | 0.070 |
| Density difference for molded part (Expt. − Calc.) | 0.142 | 0.154 | 0.210 |
| Tensile modulus (GPa) | 3.1 | 3.1 | 3.2 |
| Tensile strength (MPa) | 72 | 50 | 72 |
| Nominal strain at break (%) | 5.2 | 2.8 | 5 |
| Notched Izod impact strength (kJ/m2) | 4 | 2.1 | 4 |
| Flow CTE (m/m/C) × $10^{-5}$ | 7 | — | — |
| Cross flow CTE (m/m/C) × $10^{-5}$ | 7 | — | — |

Contrasting Comparative Example 1 (without hollow glass beads) with Examples 7-12 (with hollow glass beads having the presently required properties) shows that the inventive compositions exhibit increased tensile modulus and decreased coefficient of thermal expansion. Contrasting Example 7 (with untreated K46 hollow glass beads) with Example 8 (with treated K46 hollow glass beads), and Example 9 (with untreated S38XHS hollow glass beads) with Example 10 (with treated S38XHS hollow glass beads), and Example 11 (with untreated S38HS hollow glass beads) with Example 12 (with treated S38HS hollow glass beads) shows that use of surface-treated hollow glass beads is associated Comparative Example 8, Examples 7-12

Comparing Examples 13-20 (with hollow glass beads having the presently required properties) with Comparative Example 8 (without hollow glass beads) demonstrates the combined effect of hollow glass beads and resin additives (SEBS and HIPS). It is observed that there is significant decrease in thermal conductivity for Examples 13-20 relative to Comparative Example 8. Examples 13-20 all exhibited thermal conductivity values less than or equal to 0.2 watts/Kelvin-meter, and six of the eight examples demonstrated thermal conductivity values less than or equal to 0.19 watts/Kelvin-meter.

TABLE 4

| | C. Ex. 8 | Ex. 13 | Ex. 14 | Ex. 15 |
|---|---|---|---|---|
| COMPOSITIONS | | | | |
| PPE | 53.33 | 0 | 0 | 0 |
| PA66 | 45 | 0 | 0 | 0 |
| Stabilizer | 0.27 | 0 | 0 | 0 |
| LDPE/Dynamar | 1 | 0 | 0 | 0 |
| Carbon black | 0.05 | 0 | 0 | 0 |
| Citric acid | 0.4 | 0 | 0 | 0 |
| C. Ex. 8 | — | 75 | 70 | 75 |
| SEBS | 0 | 0 | 0 | 5 |
| HIPS | 0 | 5 | 10 | 0 |
| S38XHS | 0 | 20 | 20 | 20 |
| Treated S38XHS | 0 | 0 | 0 | 0 |
| PROPERTIES | | | | |
| Hollow glass bead crush strength (MPa) | — | 38 | 38 | 38 |
| Hollow glass bead true density (g/mL) | — | 0.38 | 0.38 | 0.38 |
| Char (wt %) | — | 18.4 | 21.3 | 15.9 |
| Thermal conductivity at 50° C. (W/mK) | 0.235 | 0.19 | 0.185 | 0.19 |
| Density of pellet (g/cc) | 1.1 | 0.83 | 0.83 | 0.90 |
| Density difference for pellet (Expt. − Calc.) | ≤0.005 | 0.012 | 0.049 | 0.061 |
| Density difference for molded part (Expt. − Calc.) | ≤0.005 | 0.146 | 0.171 | 0.130 |
| Tensile modulus (GPa) | 2.6 | 3.4 | 3.5 | 2.9 |
| Tensile strength (MPa) | 59.8 | 60.1 | 55.1 | 58.8 |
| Nominal strain at break (%) | 22 | 2.9 | 2.4 | 3.6 |
| Notched Izod impact strength (kJ/m2) | 6 | 2.5 | 2.3 | 3.5 |
| VST (° C.) | 212 | 199 | 187 | 208 |

| | Ex. 16 | Ex. 17 | Ex. 18 | Ex. 19 | Ex. 20 |
|---|---|---|---|---|---|
| COMPOSITIONS | | | | | |
| PPE | 0 | 0 | 0 | 0 | 0 |
| PA66 | 0 | 0 | 0 | 0 | 0 |
| Stabilizer | 0 | 0 | 0 | 0 | 0 |
| LDPE/Dynamar | 0 | 0 | 0 | 0 | 0 |
| Carbon black | 0 | 0 | 0 | 0 | 0 |
| Citric acid | 0 | 0 | 0 | 0 | 0 |
| C. Ex. 8 | 70 | 75 | 70 | 75 | 70 |
| SEBS | 10 | 0 | 0 | 5 | 10 |
| HIPS | 0 | 5 | 10 | 0 | 0 |
| S38XHS | 20 | 0 | 0 | 0 | 0 |
| Treated S38XHS | 0 | 20 | 20 | 20 | 20 |
| PROPERTIES | | | | | |
| Hollow glass bead crush strength (MPa) | 38 | 38 | 38 | 38 | 38 |
| Hollow glass bead true density (g/mL) | 0.38 | 0.38 | 0.38 | 0.38 | 0.38 |
| Char (wt %) | 17.6 | 17.8 | 17.8 | 17.2 | 14 |
| Thermal conductivity at 50° C. (W/mK) | 0.188 | 0.194 | 0.19 | 0.19 | 0.2 |
| Density of pellet (g/cc) | 0.89 | 0.83 | 0.83 | 0.90 | 0.89 |
| Density diff. for pellet (Expt. − Calc.) | 0.074 | 0.009 | 0.011 | 0.077 | 0.032 |
| Density diff. for molded part (Expt. − Calc.) | 0.147 | 0.143 | 0.133 | 0.146 | 0.105 |
| Tensile modulus (GPa) | 2.6 | 3.4 | 3.4 | 3.01 | 2.58 |
| Tensile strength (MPa) | 42.5 | 76.4 | 73.2 | 64 | 51.4 |
| Nominal strain at break (%) | 2.5 | 4.5 | 4.1 | 6.8 | 4 |
| Notched Izod impact strength (kJ/m2) | 3.1 | 3.6 | 3.4 | 4.6 | 3.8 |
| VST (° C.) | 189 | 204 | 189 | 212 | 197 |

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

All ranges disclosed herein are inclusive of the endpoints, and the endpoints are independently combinable with each other.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The invention claimed is:

1. A thermally insulated structural member for a door or window, comprising:
   a frame comprising a metal; and
   an insulation bar at least partially enclosed by the frame;
      wherein the insulation bar comprises a thermoplastic composition comprising
         about 55 to about 95 weight percent of a compatibilized polyamide-poly(arylene ether) composition, and
         about 5 to about 45 weight percent of hollow glass beads, wherein the hollow glass beads have
            a volume-average diameter of about 20 to about 60 micrometers,
            a true density of about 0.3 to about 0.5 grams per milliliter, and
            an isostatic crush strength of about 30 to about 60 megapascals;
      wherein the thermoplastic composition comprises less than 5 weight percent of fibrous reinforcement;
      wherein the thermoplastic composition has a density of about 0.8 to about 1 gram per milliliter; and
      wherein the thermoplastic composition excludes foaming agents and their residue.

2. The thermally insulated structural member of claim 1, wherein the thermoplastic composition has a thermal conductivity less than or equal to 0.24 watts per meter-Kelvin, measured according to ASTM E 1530 at 50° C. using a disc measuring 40 millimeters in diameter and 3.4 millimeters in thickness.

3. The thermally insulated structural member of claim 1, wherein the thermoplastic composition has a thermal conductivity of about 0.16 to about 0.24 watts per meter-Kelvin, measured according to ASTM E 1530 at 50° C. using a disc measuring 40 millimeters in diameter and 3.4 millimeters in thickness.

4. The thermally insulated structural member of claim 1, wherein the poly(arylene ether) has an intrinsic viscosity of about 0.3 to about 0.6 deciliter per gram, measured at 25° C. in chloroform.

5. The thermally insulated structural member of claim 1, wherein the compatibilized polyamide-poly(arylene ether) composition comprises the poly(arylene ether) and the polyamide in a weight ratio of about 0.5:1 to about 1.2:1.

6. The thermally insulated structural member of claim 1, wherein the thermoplastic composition further comprises about 0.5 to about 2 weight percent of a low density polyethylene.

7. The thermally insulated structural member of claim 1, wherein the thermoplastic composition further comprises about 0.02 to about 0.1 weight percent of a copolymer of vinylidene fluoride and hexafluoropropylene.

8. The thermally insulated structural member of claim 1, wherein the thermoplastic composition further comprises about 0.5 to about 2 weight percent of a low density polyethylene, and about 0.02 to about 0.1 weight percent of a copolymer of vinylidene fluoride and hexafluoropropylene.

9. The thermally insulated structural member of claim 1, wherein the thermoplastic composition further comprises about 2 to about 30 weight percent of rubber-modified polystyrene, polystyrene-poly(ethylene-butylene)-polystyrene triblock copolymer, or a combination thereof.

10. The thermally insulated structural member of claim 1, wherein the hollow glass beads comprise a surface coating comprising an aminosilane.

11. The thermally insulated structural member of claim 1, wherein the insulation bar comprises a wall having a thickness of about 0.2 to about 4 millimeters.

12. A thermally insulated structural member for a door or window, comprising:
   a frame comprising a metal; and
   an insulation bar at least partially enclosed by the frame;
      wherein the insulation bar comprises a thermoplastic composition comprising
         about 55 to about 95 weight percent of a compatibilized polyamide-poly(arylene ether) composition, and
         about 5 to about 45 weight percent of hollow glass beads, wherein the hollow glass beads have
            a volume-average diameter of about 20 to about 60 micrometers,
            a true density of about 0.3 to about 0.5 grams per milliliter, and
            an isostatic crush strength of about 30 to about 60 megapascals;
      wherein the thermoplastic composition comprises less than 5 weight percent of fibrous reinforcement;
      wherein the insulation bar comprises a wall having a thickness of about 0.2 to about 4 millimeters;
      wherein the compatibilized polyamide-poly(arylene ether) composition is the product of melt blending components comprising
         about 32 to about 45 weight percent of the poly(arylene ether); wherein the poly(arylene ether) comprises a poly(2,6-dimethyl-1,4-phenylene ether) having an intrinsic viscosity of about 0.3 to about 0.6 deciliter per gram, measured at 25° C. in chloroform,
         about 32 to about 45 weight percent of the polyamide; wherein the polyamide comprises a polyamide-6,6,
         about 0.15 to about 2 weight percent of a compatibilizing agent for the poly(2,6-dimethyl-1,4-phenylene ether) and the polyamide-6,6, and about 15 to about 25 weight percent of the hollow glass beads;
      wherein the thermoplastic composition has a density of about 0.8 to about 1 gram per milliliter;
      wherein the thermoplastic composition excludes foaming agents and their residue; and
      wherein the thermoplastic composition has a thermal conductivity less than or equal to 0.2 watts per meter-Kelvin, measured according to ASTM E 1530 at 50° C. using a disc measuring 40 millimeters in diameter and 3.4 millimeters in thickness.

13. The thermally insulated structural member of claim 12, wherein the thermoplastic composition has a thermal conductivity of about 0.16 to 0.2 watts per meter-Kelvin.

14. The thermally insulated structural member of claim 12, wherein the melt blended components further comprise about 3 to about 13 weight percent of rubber-modified polystyrene.

15. The thermally insulated structural member of claim 12, wherein the melt blended components further comprise about 0.5 to about 2 weight percent of a low density polyethylene and about 0.02 to about 0.1 weight percent of a copolymer of vinylidene fluoride and hexafluoropropylene.

16. A window comprising the thermally insulated structural member of claim 1.

17. A door comprising the thermally insulated structural member of claim 1.

18. A method of reducing the thermal conductivity of a thermally insulated structural member for a door or window, comprising:
   at least partially enclosing in a metal frame an insulation bar comprising a thermoplastic composition comprising
      about 55 to about 95 weight percent of a compatibilized polyamide-poly(arylene ether) composition, and
      about 5 to about 45 weight percent of hollow glass beads, wherein the hollow glass beads have
         a volume-average diameter of about 20 to about 60 micrometers,
         a true density of about 0.3 to about 0.5 grams per milliliter, and
         an isostatic crush strength of about 30 to about 60 megapascals;

wherein the thermoplastic composition comprises less than 5 weight percent of fibrous reinforcement;
wherein the thermoplastic composition excludes foaming agents and their residue; and
wherein the thermoplastic composition has a density of about 0.8 to about 1 gram per milliliter.

* * * * *